United States Patent
Aufschläger et al.

(10) Patent No.: US 10,612,903 B2
(45) Date of Patent: Apr. 7, 2020

(54) TEST SYSTEM AND METHOD FOR DETERMINING AN INTERNAL DIAMETER OF A HOLLOW BODY

(71) Applicant: Sturm Maschinen- & Anlagenbau GmbH, Salching (DE)

(72) Inventors: Gerhard Aufschläger, Plattling (DE); Wolfgang Ullrich, Starnberg (DE); Florian Bader, Pießenberg (DE); Marc Kesting, Straubing (DE); Ralf Völlinger, Straubing (DE)

(73) Assignee: Sturm Maschinen- & Analagenbau GmbH, Salching (DE)

( * ) Notice: Subject to any disclaimer, the term of this patent is extended or adjusted under 35 U.S.C. 154(b) by 159 days.

(21) Appl. No.: 15/543,316

(22) PCT Filed: Jan. 15, 2016

(86) PCT No.: PCT/EP2016/050740
§ 371 (c)(1),
(2) Date: Jul. 13, 2017

(87) PCT Pub. No.: WO2016/087683
PCT Pub. Date: Jun. 9, 2016

(65) Prior Publication Data
US 2018/0003474 A1    Jan. 4, 2018

(30) Foreign Application Priority Data
Jan. 20, 2015    (EP) ..................................... 15151732

(51) Int. Cl.
*G01M 15/02*    (2006.01)
*G01B 11/12*    (2006.01)
(Continued)

(52) U.S. Cl.
CPC .......... *G01B 5/003* (2013.01); *G01B 11/0616* (2013.01); *G01B 11/0625* (2013.01);
(Continued)

(58) Field of Classification Search
CPC ...... G01B 5/003; G01B 11/026; G01B 11/08; G01B 11/12; G01B 21/10; G01B 21/14
(Continued)

(56) References Cited

U.S. PATENT DOCUMENTS

| 4,872,269 A | 10/1989 | Sattmann |
| 4,946,275 A * | 8/1990 | Bartholomew ........ G01D 5/268 |
| | | 250/227.21 |

(Continued)

FOREIGN PATENT DOCUMENTS

| DE | 19934991 | 6/2000 |
| EP | 2261594 A1 | 12/2010 |

(Continued)

OTHER PUBLICATIONS

International Search Report and Written Opinion dated Jun. 9, 2016 for PCT/EP2016/050740.

*Primary Examiner* — Eric S. McCall
(74) *Attorney, Agent, or Firm* — Dinsmore & Shohl LLP

(57) ABSTRACT

A test system for examining a hollow body, in particular a cylinder bore in an engine block, comprises a measuring apparatus comprising an elongate body and a plurality of sensors which are connected to the body and are set up to carry out a distance measurement. The test system also comprises electronic control means which are set up to move the measuring apparatus into a hollow body to be examined and to determine an internal diameter of the hollow body on the basis of distance measurement data from the sensors. In order to examine hollow bodies of different diameters, at least some of the sensors are in the form of movable sensors (Continued)

which can be moved relative to the elongate body of the measuring apparatus. The electronic control means are also set up to select a measuring position of the movable sensors relative to the elongate body on the basis of a hollow body to be examined. A calibration station is provided and the electronic control means are set up to carry out a calibration process for the movable sensors. A corresponding method is also disclosed.

15 Claims, 1 Drawing Sheet

(51) Int. Cl.
    *G01B 21/14*     (2006.01)
    *G01B 5/00*     (2006.01)
    *G01B 11/06*     (2006.01)
    *G01B 11/14*     (2006.01)
    *G01B 11/30*     (2006.01)
    *G01M 15/08*     (2006.01)

(52) U.S. Cl.
    CPC ............. *G01B 11/12* (2013.01); *G01B 11/14* (2013.01); *G01B 21/14* (2013.01); *G01B 11/303* (2013.01); *G01M 15/02* (2013.01); *G01M 15/08* (2013.01)

(58) Field of Classification Search
    USPC ...................................................... 73/114.77
    See application file for complete search history.

(56) References Cited

U.S. PATENT DOCUMENTS

| | | | | |
|---|---|---|---|---|
| 5,825,017 A | * | 10/1998 | Pryor | ......................... F02F 1/24 250/208.1 |
| 5,871,391 A | * | 2/1999 | Pryor | ......................... F02F 1/24 356/600 |
| 2007/0139059 A1 | | 6/2007 | Lindner et al. | |
| 2011/0080588 A1 | * | 4/2011 | Segall | .................. G01N 21/954 356/445 |
| 2013/0125615 A1 | * | 5/2013 | Candiani | ............... B24B 49/045 73/1.79 |
| 2017/0097306 A1 | * | 4/2017 | Ullrich | ................... G01B 5/003 |
| 2017/0157633 A1 | * | 6/2017 | Ebenbeck | ........... B05C 11/1039 |
| 2017/0248415 A1 | * | 8/2017 | Matsumiya | ............ G01B 11/30 |
| 2017/0349991 A1 | * | 12/2017 | Ebenbeck | ................ C23C 4/08 |
| 2018/0010905 A1 | * | 1/2018 | Wimmer | ............... B05B 12/084 |
| 2018/0299261 A1 | * | 10/2018 | Ullrich | ................. G01B 11/007 |

FOREIGN PATENT DOCUMENTS

| | | |
|---|---|---|
| EP | 2957859 | 12/2015 |
| GB | 2436618 A | 10/2007 |

\* cited by examiner

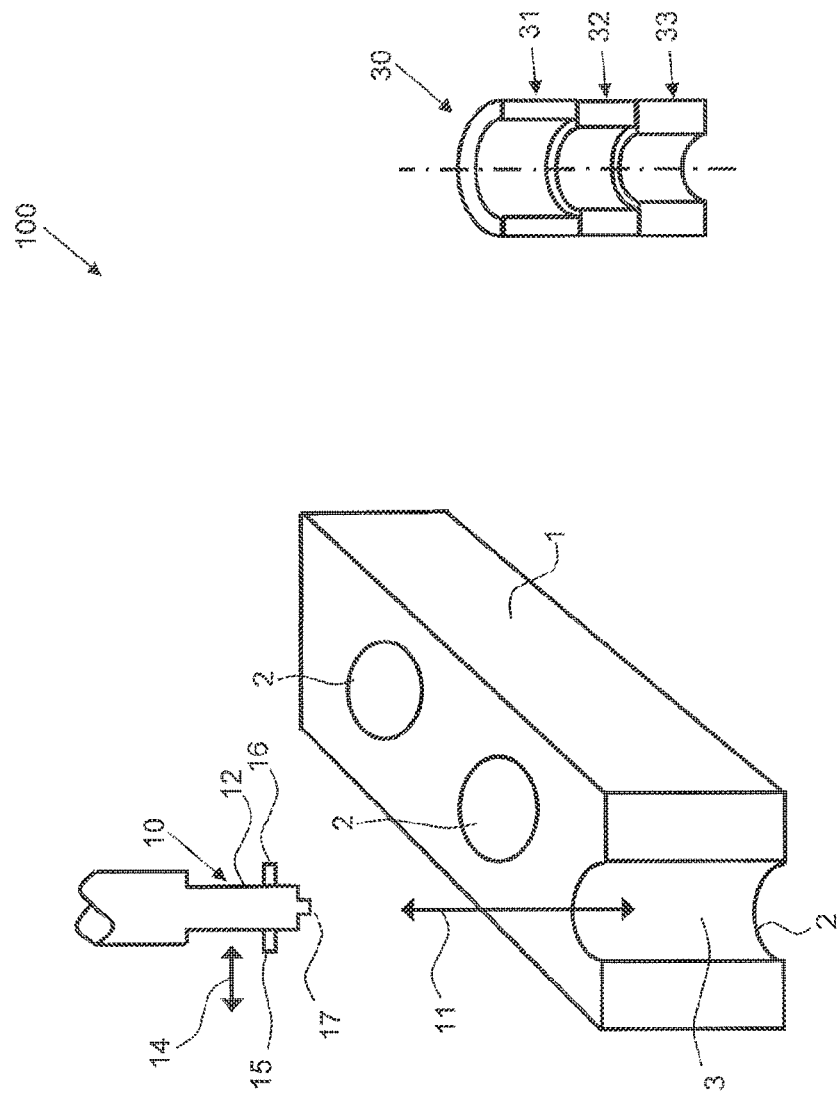

TEST SYSTEM AND METHOD FOR DETERMINING AN INTERNAL DIAMETER OF A HOLLOW BODY

BACKGROUND

Field

The present invention relates in a first aspect to a test system for examining a hollow body, in particular a cylinder bore in an engine block, according to the preamble of claim 1.

In a second aspect the invention relates to a corresponding method for examining a hollow body, in particular a cylinder bore in an engine block, according to the preamble of claim 14.

Technical Background

An engine block of such type can be used for combustion engines of motor vehicles for example. It comprises several cylinder bores, the dimensions and wall properties of which must meet precise requirements in order to ensure as high an efficiency as possible of the combustion engine. In the present case, a cylinder bore can generally be understood as a cylindrical hollow space with a round, in particular a circular cross section.

In many cases a coating is applied to the inner wall of a cylinder bore. This has to meet specific requirements, especially with regard to its layer thickness, with the highest possible accuracy.

The properties of such a hollow body and/or of the applied coating can be examined with a generic test system. A generic test system for examining a hollow body, in particular a cylinder bore in an engine block, comprises:

- a measuring device having an elongate body and several sensors which are connected to the body and adapted to carry out a distance measurement and
- electronic control means which are adapted to move the measuring device, i.e. the elongate body and the sensors connected thereto, into a hollow body to be examined, whereupon the sensors record distance measurement data regarding their distance to an inner wall of the hollow body, and to determine an internal diameter of the hollow body on the basis of the distance measurement data of the sensors.

In a generic method for examining a hollow body, in particular a cylinder bore in an engine block, a measuring device is provided which comprises an elongate body and several sensors which are connected to the body and adapted to carry out a distance measurement. The method comprises the steps that the measuring device is moved into a hollow body to be examined, carries out a distance measurement to an inner wall of the hollow body there and on the basis of distance measurement data of the sensors recorded thereby an internal diameter of the hollow body is determined.

A test system for examining a hollow body, to the inner walls of which a coating is applied, is known from DE 199 34 991 A1. Moreover, a generic test system and a corresponding method are described by the applicant in the as yet not published European patent application having the application number 14 172 886.

It is desirable that hollow bodies or engine blocks of any possible type can be examined with the same test system and method. This proves to be especially difficult if different hollow bodies vary considerably in their dimensions.

SUMMARY

An object of the invention can be considered to reside in the provision of a test system and a method, with which hollow bodies of different dimensions can be examined as precisely as possible.

The object is achieved by the test system having the features of claim 1 and by the method having the features of claim 14.

Advantageous variants of the test system according to the invention and the method according to the invention are the subject matter of the dependent claims and are furthermore set out in the following description.

Concerning the test system of the above-stated type provision is made in accordance with the invention in that for the examination of hollow bodies of different diameters at least a part of the sensors are designed as movable sensors which are movable relative to the elongate body of the measuring device. Depending on a hollow body to be examined the electronic control means are adapted to select a measuring position of the movable sensors relative to the elongate body. Moreover, a calibrating station is provided and the electronic control means are adapted to carry out a calibration process for the movable sensors on the calibrating station.

Concerning the method of the above-stated type it is set out in accordance with the invention that for the examination of hollow bodies of different diameters at least a part of the sensors are designed as movable sensors which are movable relative to the elongate body of the measuring device. Depending on a hollow body to be examined a measuring position of the movable sensors relative to the elongate body is selected.

Furthermore, a calibration process for the movable sensors can preferably be carried out on the calibrating station.

In the calibration process provision can in particular be made in that
- the measuring device is moved to a calibrating station,
- the movable sensors are moved to a specific reference measuring position relative to the elongate body,
- with the movable sensors in the reference measuring position a reference measurement is carried out, with which distances to the calibrating station are measured, and
- a relation between previously known dimensions of the calibrating station and measurement data of the reference measurement is ascertained and stored.

The relation thus ascertained can then be used for the stated determination of the internal diameter of a hollow body to be examined on the basis of the distance measurement data of the sensors.

In principle, the order of the calibration process and the test measurement, i.e. the distance measurement to an inner wall of a hollow body to be tested, is arbitrary. It is expedient to calculate the diameter from the distance measurement data only when a calibration process has been carried out. By preference, the calibration process takes place prior to the test measurement so that together with the distance measurement to a hollow body there can be a direct calculation of the related internal diameter.

Depending on the construction, sensors can have a small measuring range. For instance, certain sensors are only able to precisely ascertain a distance within a specific distance interval. Thus, depending on the internal diameter of a hollow body to be examined it may be the case that a distance of the sensors to the inner walls of the hollow space lies outside the measuring range of the sensors. However, in order to still be able to measure this distance precisely, according to a central idea of the invention not all of the sensors are rigidly connected to the elongate body of the measuring device. In fact, at least some of the sensors can be adjusted radially outwards. Once the measuring device has been moved into a hollow body to be examined the movable sensors can thus be adjusted in the direction of the inner walls of the hollow body. Through this, the distance of the movable sensors to the inner wall of the hollow body can be changed in such a manner that it lies within a desired distance interval, in which the sensors can measure more precisely.

For this purpose, the movable sensors can be adjusted, in particular folded out or extended in the radial direction with respect to the elongate body. The radial direction indicates a direction perpendicular to the longitudinal axis of the elongate body. An extension process of the movable sensors can either comprise a motion component in the radial direction or occur exclusively in the radial direction.

By making use of several movable sensors a diameter of the hollow body to be examined, i.e. an internal diameter of a hollow space in the hollow body, can be calculated from the respective distance measurements.

If the movable sensors comprise at least three sensors, the measuring direction of which is offset to each other in the azimuthal direction, it is not necessary for the measuring device to be moved into the hollow space or body to be examined precisely along the central axis thereof. In fact, even when the measuring device is offset from the central axis the diameter can be ascertained precisely. For example three sensors can be provided, whose alignment to each other is in each case turned by 120° around a longitudinal axis of the elongate body.

In a preferred method variant in order to carry out a testing of an inner wall of the hollow body the movable sensors are moved away from the elongate body while the measuring device has moved into the hollow body to be examined. By contrast, the movable sensors are retracted towards the elongate body while the measuring device is being moved into a hollow body to be examined or moved out of a hollow body to be examined. This reduces the risk of an unwanted collision of the sensors with the hollow body to be examined. Nevertheless, the relatively small distance to the hollow body required for the measuring process can be reached.

By preference, the electronic control means, by taking an expected internal diameter of the hollow body to be examined into account, are adapted to set a measuring position, to which the movable sensors are moved for a distance measurement. The expected internal diameter can be a given nominal value for example. Hence, for hollow bodies with internal diameters of different sizes the movable sensors are in this case not moved into the same measuring position. In fact, the sensors are extended to a greater degree in the case of a large internal diameter than in the case of a small internal diameter.

To enable a precise determination of the internal diameter the distance, by which the movable sensors are adjusted, must be taken into account as accurately as possible. However, throughout numerous motion processes of the sensors deviations in a position setting of the sensors may occur. A measuring position of the movable sensors is also known in a relatively imprecise manner if a change from a previous (in particular precisely known) measuring position of the sensors to another measuring position is effected. For instance this can occur if the examination of several hollow bodies of a specific internal diameter has been completed and subsequently the progressive examination of different hollow bodies with a different internal diameter follows.

A fundamental idea of the invention aims at being able to precisely ascertain an internal diameter of a hollow body even if the measuring position of the movable sensors is not known exactly. Indeed, the movable sensors can be moved in a reproducible manner to a specific measuring position relative to the elongate body of the measuring device but this measuring position is not known precisely. If a wrong value is assumed for the measuring position this would have a direct effect on the internal diameter of the hollow body calculated on the basis thereof.

To avoid this, a calibration or reference measurement is carried out in accordance with the invention. In this process, the movable sensors are moved to a reference measuring position. This refers to a position of the movable sensors relative to the elongate body of the measuring device. In particular, the reference measuring position can be the same as the measuring position of the movable sensors relative to the elongate body, in which a hollow body is examined after the calibration process has been carried out. Thus, a reference measurement can be effected, in which the movable sensors are arranged in the same way relative to the elongate body as during a measurement of a hollow body to be examined.

By way of the reference measurement distances to a calibrating station are ascertained. The calibrating station can comprise the shape of a hollow cylinder for example. From the measurement data of the reference measurement a diameter of the hollow cylinder of the calibrating station can then be derived. Subsequently, the derived (measured) diameter is compared with the known value of the diameter of the hollow cylinder of the calibrating station. The relation between these data is stored and used as a calibration. This means that from ensuing distance measurement data of the movable sensors an internal diameter of the examined hollow body is calculated whilst taking account of the previously stated relation.

As an essential process of these measures the movable sensors can in principle be moved to a variety of different measuring positions without having to laboriously measure the position of the movable sensors.

It is expedient if the calibrating station has at least one circular opening corresponding to a hollow cylinder, into which the measuring device is moved for the calibration process. It may be preferable for the calibrating station to comprise at least one reference ring, into which the measuring device is moved. The reference ring or reference rings can be held by a holder in a defined position. This enables an easy exchange or addition of a reference ring with a specific internal diameter.

For a greater degree of flexibility the calibrating station can comprise several reference rings which differ in their internal diameter. The reference rings can in particular be arranged concentrically on top of each other. For the calibration measurement an internal diameter of one of the reference rings can be determined. Selection can be made for that reference ring, the internal diameter of which comes closest to the hollow body examined afterwards or beforehand. In other words, the electronic control means can be adapted to select one of the reference rings depending on the expected internal diameter of the hollow body to be examined.

By preference, the calibration process is carried out automatically when a change is made from tested hollow bodies of a particular size to hollow bodies of a different size that are to be tested. For this purpose, the electronic control means can be adapted to carry out the calibration process at least every time a next hollow body with a measuring position different to a previous hollow body is to be examined. In this situation the sensors are moved into a different measuring position relative to the elongate body than during the examination of the previous hollow body.

The reference measuring position for the calibration process can be selected to be the same as the measuring position for the next hollow body. As a result, the calibration is suitable for the following measurement. Alternatively or additionally, a calibration process can also be carried out, in which the reference measuring position is the same as the measuring position used with the previous hollow body. The calibration thus possible is expediently used for the calculation of the internal diameter of the previous hollow body rather than for the calculation of the internal diameter of the next hollow body, for which a different measuring position is used.

Additionally or alternatively, the electronic control means can furthermore be adapted to always carry out the calibration process at least after a predeterminable time and/or a predeterminable number of hollow bodies examined. In this way, a consistently high measuring accuracy is ensured even in the case of a large number of hollow bodies to be tested.

The invention furthermore relates to a coating system for coating an inner wall of a hollow body, in particular a running surface of a cylinder bore in an engine block. The coating system comprises at least one rotatable coating lance, by which a metal plasma jet for coating the inner wall can be generated, and a test system in accordance with the invention. By ascertaining an internal diameter by means of the test system it is on the one hand possible to test an applied coating. On the other hand, through such a measurement made before application of the coating information can be obtained that may be useful for the coating process. Moreover, by means of the test system a thickness of a coating can be ascertained.

For this purpose, an internal diameter of the hollow body is ascertained by means of the measuring device before and after application of a coating to an inner wall of the hollow body. A thickness of the coating can then be calculated by comparing, in particular by calculating the difference of the internal diameters ascertained before and after application of the coating.

These method steps, when carried out by the coating system according to the invention, can be realized in that the electronic control means are adapted
- to ascertain an internal diameter of the hollow body by means of the measuring device,
- to then apply a coating with the coating lance onto an inner wall of the hollow body,
- to subsequently ascertain an internal diameter of the hollow body now coated by means of the measuring device,
- to calculate a thickness of the coating by comparing the internal diameters ascertained before and after application of the coating.

The descriptions outlined for testing and determining an internal diameter of a hollow body are also applicable to hollow bodies having several hollow spaces or cylinder bores to be tested. In this case, the descriptions apply separately for each hollow space of the hollow body.

As a rule, a rotation of the measuring device inside the cylinder bore of the hollow body is not necessary if at least three sensors are used for distance measurement.

The properties of the invention described as additional device features are also to be considered as variants of the method according to the invention and vice versa.

In principle, the movable sensors can be any type of distance-measuring sensors. By preference, use is made of optical sensors, in particular triangulation sensors or confocal sensors.

As a separate idea of the invention a test system can also be considered which comprises the features of claim 1 except for the calibrating station and the design of the electronic control means for carrying out the calibration process. In particular, such a test system offers the advantage that cylinder bores of various diameters can be measured precisely by the movable sensors.

BRIEF DESCRIPTION OF THE DRAWINGS

Further advantages and features of the invention are described hereinafter with reference to the accompanying schematic FIGURE.

FIG. 1 shows a schematic illustration of an embodiment of a test system according to the invention and of a hollow body to be examined.

DETAILED DESCRIPTION

In FIG. 1 an embodiment of a test system 100 according to the invention and of a hollow body 1 to be examined is shown schematically.

The test system 100 comprises a measuring device 10 for examining a hollow body 1, a holding device, not depicted here, for the hollow body 1 currently to be examined and a calibrating station 30 for the measuring device 10.

A hollow body 1 to be examined or tested can be an engine block with several cylinder bores 2 for example. Testing involves the properties of the cylinder bores 2, especially the diameter of the respective cylinder bore 2.

For this purpose, a measuring device 10 is employed that comprises an elongate body 12 and sensors 15, 16, 17 connected thereto.

Due to the elongate body 12 the measuring device 10 can be moved into the cylinder bores 2. In the FIGURE this movement is illustrated by the double arrow 11 in the axial direction of the cylinder bore 2. Expediently, for this purpose a diameter of the elongate body 12 is smaller than the diameters of the cylinder bores 2, while the length of the elongate body 12 can be greater.

The sensors 15, 16, 17 or components thereof can be connected indirectly or directly to the elongate body 12. For instance some of the sensors or all of them can have optical fibers which are guided on the elongate body and via which measuring light can be emitted and/or received.

Sensor 17 can be designed for taking a panoramic picture, for which it can receive light from a 360°-range. To this end, a mirror or a prism inclined with respect to the longitudinal axis of the elongate body 12 can be used that is rotationally symmetrical to the longitudinal axis. In this way, light from a 360°-range around the longitudinal axis can be transmitted towards a camera or another type of optical receiver of the sensor 17.

With such a sensor 17 properties of an inner wall 3 of a hollow cylinder can be tested, in particular the roughness or material properties that have an effect on a paint of the inner wall 3.

To measure a diameter of the cylinder bore 2 use is made of the sensors 15, 16 in particular. At least three, by preference precisely three sensors 15, 16 of the same type are present, two of which are shown in the FIGURE for clarified illustration. The sensors 15, 16 each measure a distance to the inner wall 3 of the cylinder bore 2. Knowing the dimensions of the measuring device 10 the diameter can be calculated from the measured spaces/distances.

If the measuring device 10 is moved into the cylinder bore 2 precisely on the longitudinal axis thereof, one sensor 15 with one distance measurement would already be sufficient to ascertain the diameter precisely. In practice, however, deviations of the measuring device 10 from the longitudinal axis of the cylinder bore 2 cannot be avoided. Nevertheless, the diameter can be determined with a high level of accuracy if three sensors 15, 16 are present that measure the distance in different directions.

A preferred application of ascertaining the diameter by means of the measuring device 10 resides in determining the thickness of a coating of the inner wall 3 of a hollow cylinder 2. To this end, a diameter is measured before and after application of a coating. The difference of these diameter values results in the thickness of the applied coating. For conclusive results of a relatively thin layer the distance measurements have to be implemented with the greatest accuracy.

The sensors currently available for this have a strongly limited measuring range so that the sensors 15, 16 have to be moved to a distance to the inner wall 3 that lies within their measuring range. Since the diameters of different cylinder bores 2 can vary (for example according to the engine model) and in order to prevent collisions of the sensors 15, 16 with the hollow body 1 the sensors 15, 16 are designed in a movable manner. They can be extended transversely to the longitudinal axis of the elongate body 12, i.e. in the direction of the double arrow 14 in FIG. 1, until their distance to the inner wall 3 lies within their measuring range. The position of the movable sensors 15, 16, in which a distance measurement to the inner wall 3 is effected, is in the present case referred to as measuring position that relates to the position relative to the elongate body 12.

In order that a diameter can be ascertained precisely by way of such distance measurements the measuring position of the sensors 15, 16 must be known as precisely as possible. If an actual measuring position deviates from an assumed measuring position this has a detrimental effect on the accuracy of the diameter value ascertained.

To solve this problem a calibrating station 30 is employed. On this, a distance measurement is carried out with the sensors 15, 16, in which case the dimensions of the calibrating station are already known and thus the result of the distance measurement can be compared with a previously known value. In particular, the calibrating station 30 can have one or several cylindrical openings with a diameter known in each case. On the basis of the distance measurements of the sensors 15, 16 a diameter is calculated that is compared with the known diameter. The relation of these values is used as a calibration, i.e. it is used in the calculation of a diameter from distance measurements made on examined hollow cylinders 2.

The position, into which the sensors 15, 16 are moved relative to the elongate body 12 for the calibration process, is in the present case referred to as reference measuring position. By preference, the reference measuring position is the same as the measuring position used for the testing of a hollow cylinder 2 directly succeeding the calibration process or directly preceding the calibration process.

Therefore, it is desirable that the calibrating station 30 has several cylindrical openings of different diameters, from which in each case one can be selected for the calibration process, the diameter of which comes closest to the diameter of the cylinder bore tested afterwards or beforehand.

The calibrating station 30 can in particular have several rings 31, 32, 33 that each have a different diameter, i.e. internal diameter. By the use of separate rings 31, 32, 33 a ring can be added or exchanged if hollow bodies 1 of different dimensions are to be tested henceforth.

For a better overview a section through the rings 31 to 33 is shown in FIG. 1. Expediently, use is not made of half rings but closed rings 31 to 33. Likewise, merely for the sake of a better overview the cylinder bore 2 in the hollow body 1 is shown in cut-away view, and is in fact a cylinder bore 2 that is closed over the entire shell surface.

The rings 31 to 33 and related holding means of the calibrating station 30 can be designed such that the rings 31 to 33 can be held concentrically on top of each other. As a result, a movement of the measuring device 10 to the desired ring 31, 32 or 33 can take place easily.

Advantageously, through the calibration process there is the achievement that the relative position of the movable sensors 15, 16 relative to the elongate body 12 of the measuring device 10 can be determined and/or taken into account. This is of particular advantage if a specific measuring position can be assumed in a substantially reproducible manner while precise knowledge of this measuring position is not available without calibration.

Thus, the invention provides a test system and a method, with which an internal diameter of a hollow body, in particular a cylinder bore in an engine block, can be ascertained precisely and easily. It is also possible to determine internal diameters of different sizes with a high level of accuracy.

The invention claimed is:

1. A test system for examining a hollow body, comprising:
   a measuring device comprising an elongate body and several sensors which are connected to the body and adapted to carry out a distance measurement,
   electronic control means which are adapted to move the measuring device into a hollow body to be examined and to determine an internal diameter of the hollow body on the basis of distance measurement data of the sensors,
   wherein:
   for the examination of hollow bodies of different diameters at least a part of the sensors are designed as movable sensors which are optical sensors and movable relative to the elongate body of the measuring device at least in the radial direction,
   in that depending on a hollow body to be examined the electronic control means are adapted to select a measuring position of the movable optical sensors relative to the elongate body,
   in that a calibrating station is provided and
   in that the electronic control means are adapted to carry out a calibration process for the movable sensors on the calibrating station, wherein for a calibration measurement the optical sensors are moved to a reference measuring position relative to the elongate body.

2. The test system according to claim 1,
   wherein:
   in the calibration process:
   the measuring device is moved to the calibrating station, the movable sensors are moved to a specific reference measuring position relative to the elongate body,
with the movable sensors in the reference measuring position a reference measurement is carried out, with which distances to the calibrating station are measured,
a relation between previously known dimensions of the calibrating station and measurement data of the reference measurement is ascertained and stored and
in that the electronic control means are adapted to take the ascertained relation into account in the determination of an internal diameter of a hollow body to be examined on the basis of the distance measurement data of the sensors.

3. The test system according to claim 1, wherein:
the electronic control means are adapted to carry out the calibration process at least every time a next hollow body with a measuring position different to a previous hollow body is to be examined.

4. The test system according to claim 1, wherein:
the reference measuring position of the movable sensors is the same as a measuring position, in which a hollow body is examined after the calibration process has been carried out.

5. The test system according to claim 1, wherein:
the movable sensors are adjustable in the radial direction with respect to the elongate body.

6. The test system according to claim 1, wherein:
the movable sensors comprise at least three sensors, the measuring direction of which is offset to each other in the azimuthal direction.

7. The test system according to claim 1, wherein:
the electronic control means, by taking an expected internal diameter of the hollow body to be examined into account, are adapted to set a measuring position, to which the movable sensors are moved for a distance measurement.

8. The test system according to claim 1, wherein:
the calibrating station comprises at least one reference ring, into which the measuring device is moved.

9. The test system according to claim 8, wherein:
the calibrating station comprises several reference rings which differ in their respective internal diameter.

10. The test system according to claim 9, wherein:
the several reference rings are arranged concentrically on top of each other.

11. The test system according to claim 9, wherein:
the electronic control means are adapted to select one of the reference rings depending on the expected internal diameter of the hollow body to be examined.

12. A coating system for coating an inner wall of a hollow body, comprising:
at least one rotatable coating lance, by which a metal plasma jet for coating the inner wall can be generated, and
a test system for determining an internal diameter of the hollow body, comprising:
a measuring device comprising an elongate body and several sensors which are connected to the body and adapted to carry out a distance measurement,
electronic control means which are adapted to move the measuring device into a hollow body to be examined and to determine the diameter of the hollow body on the basis of distance measurement data of the sensors,
wherein:
for the examination of hollow bodies of different diameters at least a part of the sensors are designed as movable sensors which are optical sensors and movable relative to the elongate body of the measuring device at least in the radial direction,
in that depending on a hollow body to be examined the electronic control means are adapted to select a measuring position of the movable optical sensors relative to the elongate body,
in that a calibrating station is provided and
in that the electronic control means are adapted to carry out a calibration process for the movable sensors on the calibrating station, wherein for a calibration measurement the optical sensors are moved to a reference measuring position relative to the elongate body.

13. The coating system according to claim 12, wherein:
the electronic control means are adapted:
to ascertain an internal diameter of the hollow body by means of the measuring device,
to then apply a coating with the coating lance onto an inner wall of the hollow body,
to subsequently ascertain an internal diameter of the hollow body now coated by means of the measuring device,
to calculate a thickness of the coating by comparing the internal diameters ascertained before and after application of the coating.

14. A method for examining a hollow body, comprising:
wherein a measuring device is provided which comprises an elongate body and several sensors which are connected to the body and adapted to carry out a distance measurement,
wherein the measuring device is moved into a hollow body to be examined, carries out a distance measurement to an inner wall of the hollow body there and on the basis of distance measurement data of the sensors an internal diameter of the hollow body is determined,
wherein:
for the examination of hollow bodies of different diameters at least a part of the sensors are designed as movable sensors which are optical sensors and movable relative to the elongate body of the measuring device at least in the radial direction,
in that depending on a hollow body to be examined a measuring position of the movable sensors relative to the elongate body is selected and
in that a calibration process for the movable sensors is carried out on a calibrating station, wherein for a calibration measurement the optical sensors are moved to a reference measuring position relative to the elongate body.

15. A method according to claim 14, wherein:

for testing of an inner wall of the hollow body the movable sensors are moved away from the elongate body when the measuring device has moved into the hollow body to be examined, and in that the movable sensors are retracted in the direction of the elongate body while the measuring device is being moved into a hollow body to be examined or moved out of a hollow body to be examined.

* * * * *